3,639,482
PREPARATION OF FLUOROANILINES

John W. Churchill, Mount Carmel, Ehrenfried H. Kober, Hamden, and Peter H. Scott, Guilford, Conn., assignors to Olin Mathieson Chemical Corporation
No Drawing. Filed Mar. 5, 1969, Ser. No. 804,692
Int. Cl. C07c *85/10*
U.S. Cl. 260—580                                    5 Claims

ABSTRACT OF THE DISCLOSURE

Fluoroanilines are prepared by the deoxygenation and hydrofluorination of the corresponding nitrobenzenes which are reacted in anhydrous hydrogen fluoride at 0° to 230° C. under pressures of from 15 to 1500 p.s.i.a. in the presence of carbon monoxide and a noble metal catalyst.

---

This invention relates to improvements in the direct conversion of nitrobenzenes to fluoroanilines. Improved yields of fluoroanilines are obtained with less of the corresponding unfluorinated anilines.

Many of the fluoroanilines having at least one chloro, nitro or methyl substituent in the ring are known compounds and the corresponding substituted nitrobenzenes used as starting materials are also known compounds. While the method of this invention is particularly described with reference to the conversion of nitrobenzene to p-fluoroaniline, it is also useful for the preparation of the variously substituted fluoroanilines.

p-Fluoroaniline is a known compound of known utility disclosed, for example in U.S. Pat. 2,884,458. That patent also describes and claims a process for the manufacture of p-fluoroaniline by catalytic hydrogenation of nitrobenzene in anhydrous hydrogen fluoride. Further details on that process appear in J. Org. Chem. 26, 4014–7 (1961). In the catalytic hydrogenation process, considerable amounts of ordinary aniline accompany the p-fluoroaniline and are only difficultly separated therefrom. In general, from ¼ to ½ or more of the aniline product is ordinary aniline and the balance is p-fluoroaniline.

One object of this invention is to provide a simpler, cheaper and otherwise improved process for the direct conversion of nitrobenzenes to fluoroanilines. More particularly, an object of this invention is to provide an improved process resulting in a product containing less of the corresponding unfluorinated aniline as a contaminant of the product. A further object of the invention is to provide a process in which yields of fluoroanilines are improved.

The process of this invention generally comprises reacting, at a temperature of from 100° to 230° C. under a pressure of from 15 to 1500 p.s.i.a., a mixture of a nitrobenzene, anhydrous hydrogen fluoride, carbon monoxide and a noble metal catalyst.

Suitable nitrobenzenes for use as starting materials are nitrobenzene itself and substituted nitrobenzenes having as substituent at least one of methyl, chloro and nitro substituents. Examples of nitrobenzenes suitable as starting materials and of the fluoroanilines produced by the process of this invention include, but are not limited to the following:

| Nitrobenzene starting materials: | Fluoroaniline products |
|---|---|
| Nitrobenzene | p-Fluoroaniline. |
| m-Chloronitrobenzene | 3-chloro-4-fluoroaniline. |
| m-Nitrotoluene | 4-fluoro-3-toluidine. |
| o-Nitrotoluene | 4-fluoro-2-toluidine. |
| 2,5-dichloronitrobenzene | 2,5-dichloro-4-fluoroaniline. |
| m-Dinitrobenzene | 3-nitro-4-fluoroaniline. |
| o-Chloronitrobenzene | 2-chloro-4-fluoroaniline. |
| 4-methyl-1,3-dinitrobenzene | 5-nitro-4-fluoro-2-toluidine. |

Generally the fluorine substituent takes the para position to a nitro group when that position is open and the product is a p-fluoroaniline.

In the process of the present invention, the anhydrous hydrogen fluoride supplies hydrogen for conversion of the nitro group to NH$_2$ and supplies fluorine for substitution on the ring. It is important to maintain the hydrogen fluoride at least partly in the liquid phase and therefore the critical temperature of hydrogen fluoride at 230° C. should not be exceeded. The pressures are suitably from about 15 to 1500 p.s.i.a. but higher pressures are also suitable if desired.

The minimum stoichiometric molar ratio of hydrogen fluoride to the nitrobenzene is 1:1. Less can be used, but the yields suffer. Preferably a molar ratio of hydrogen fluoride to the nitrobenzene of at least 1:1 is used and molar ratios up to 50:1 are suitable but more hydrogen fluoride can be used, if desired. Preferably molar ratios of from 10:1 to 30:1 are used.

The time required for the reaction also varies widely but satisfactory yields are usually obtained in from 1 to 10 hours or more.

Catalysts used according to the process of this invention comprise a mixture of at least one compound selected from the group consisting of palladium halides, rhodium halides, palladium oxides, and rhodium oxides with an oxide of an element selected from the group consisting of vanadium, molybdenum, tungsten, niobium, chromium, and tantalum, with or without other catalysts, and especially the following:

(1) Palladium dichloride and vanadium pentoxide
(2) Palladium dichloride and molybdenum dioxide
(3) Rhodium trichloride and vanadium pentoxide
(4) Rhodium trichloride and molybdenum dioxide
(5) Palladium dichloride, rhodium trichloride and vanadium pentoxide
(6) Rhodium trichloride, platinum tetrachloride and vanadium pentoxide
(7) Palladium dichloride, molybdenum dioxide and cupric bromide
(8) Palladium dichloride, rhodium chloride, vanadium pentoxide and cupric bromide.

When one of the above-mentioned preferred catalyst systems is employed, the weight ratio of palladium or rhodium compound to oxide of the Group V$b$ or VI$b$ metals in the catalyst system is generally in the range between about 0.001:1 and about 25:1, and preferably in the range between about 0.05:1 and about 10:1, but greater or lesser proportions may be employed if desired. When other catalytic additives such as cupric bromide, platinum tetrachloride and the like are employed as part of the catalyst system, the weight ratio of the catalytic additive to the oxide of the Group V$b$ or VI$b$ metals is also within the above-mentioned catalyst ratio ranges.

The catalyst system can be self-supported or deposited on a support or carrier for dispersing the catalyst system to increase its effective surface. Alumina, silica, carbon, barium sulfate, calcium carbonate, absestos, bentonite, diatomaceous earth, fuller's earth, and analogous materials are useful as carriers for this purpose.

The proportion of catalyst system is generally in the range between about 0.1 and about 100, and preferably between about 1 and about 60 percent by weight of the aromatic nitro compound. However, greater or lesser proportions may be employed if desired.

After reaction is completed, the product is isolated in any convenient manner. For example, the catalyst is removed by filtration, excess hydrogen fluoride is evaporated or distilled off. Water is added and the aqueous layer is made alkaline and the liberated anilines are separated and/or extracted with any suitable water immiscible organic solvent, for example, ether. The extract is dried and distilled to recover the fluoroaniline product.

EXAMPLE I

A 300 ml. Hastelloy B rocking autoclave was charged with 24.6 g. (0.20 mole) of nitrobenzene, 0.74 g. of $PdCl_2$, 0.74 g. $V_2O_5$ and 100 g. of anhydrous hydrogen fluoride; after which, it was sealed and pressurized to 900 p.s.i.g. with carbon monoxide. The mixture was then heated to 150° C. and maintained within the temperature range, 150°–160° C. for three hours. After cooling, the contents of the autoclave were discharged into a plastic beaker, where most of the HF was evaporated with a nitrogen sparge. The residue was neutralized with NaOH and extracted with ether. The ether soluble oil, recovered by evaporation of the solvent at reduced pressure, weighed 4.2 g. Vapor phase chromatographic analysis of this oil indicated it contained 72% nitrobenzene, 24% p-fluoroaniline and small amounts of aniline.

EXAMPLE II

A 300 ml. Hastelloy B rocking autoclave was charged with 24.6 g. (0.20 mole) of nitrobenzene, 0.74 g. of $PdCl_2$, 0.74 g. $V_2O_5$, and 100 g. of anhydrous hydrogen fluoride; after which, it was sealed and pressurized to 795 p.s.i.g. with carbon monoxide. The mixture was then heated to 160° C. for three hours. After cooling, the contents of the autoclave were discharged into a plastic beaker, where most of the HF was evaporated with a nitrogen sparge. The residue was neutralized with NaOH and extracted with ether. The ether soluble oil was recovered by evaporation of the solvent at reduced pressure. Vapor phase chromatographic analysis of this oil indicated it contained p-fluoroaniline and aniline in a molar ratio of 90:10.

EXAMPLE III

A 300 ml. Hastelloy B rocking autoclave was charged with 24.6 g. (0.20 mole) of nitrobenzene, 0.74 g. of $RhCl_3$, 0.74 g. of $MoO_2$ and 100 g. of anhydrous liquid HF. The mixture was pressured to 770 p.s.i.g. with carbon monoxide and heated to 110° C. for four hours. After cooling, the contents of the autoclave were discharged into a plastic beaker and most of the HF was evaporated using a nitrogen sparge. The residue was neutralized with NaOH and extracted with ether. The ether soluble oil was recovered by evaporation of the ether. Vapor phase chromatography showed that the product contained 60 mole percent of p-fluoroaniline.

EXAMPLE IV

Substantially the same results were obtained when the procedure of Example III was repeated substituting as catalyst a mixture of 0.37 g. of $PdCl_2$, 0.37 g. of $RhCl_3$ and 0.74 g. of $V_2O_5$.

What is claimed is:

1. Process for preparing a fluoroaniline by heating at a temperature of from 100° to 230° C. under a pressure of 15 to 1500 p.s.i.a. a mixture of anhydrous hydrogen fluoride, a nitrobenzene selected from the group consisting of nitrobenzene and substituted nitrobenzenes having only substituents selected from the group consisting of methyl, chloro and nitro substituents, carbon monoxide and a catalyst mixture consisting essentially of a compound selected from the group consisting of palladium halides, rhodium halides, palladium oxides, and rhodium oxides and mixtures thereof with an oxide of an element selected from the group consisting of vanadium, molybdenum, tungsten, niobium, chromium and tantalum and mixtures thereof.

2. Process as claimed in claim 1 in which the proportion of said catalyst mixture is from 0.1 to 100 percent by weight of said nitrobenzene.

3. Process as claimed in claim 1 in which the molar ratio of said hydrogen fluoride to said nitrobenzene is from 1:1 to 50:1.

4. Process as claimed in claim 1 in which said catalyst mixture is palladium chloride and vanadium pentoxide in the range of 0.001:1 to 25:1 by weight respectively and the temperature is from 120° to 170° C.

5. Process as claimed in claim 1 in which said nitrobenzene is nitrobenzene and said fluoroaniline is p-fluoroaniline.

References Cited

UNITED STATES PATENTS

| | | | |
|---|---|---|---|
| 2,884,458 | 4/1959 | Fidler | 260—580 |
| 3,265,636 | 8/1966 | Spiegler | 260—580 X |
| 3,293,295 | 12/1966 | Swakon et al. | 260—580 X |

ROBERT V. HINES, Primary Examiner

U.S. Cl. X.R.

252—456, 458, 460, 470; 260—578